US010021200B2

(12) United States Patent
Deo et al.

(10) Patent No.: US 10,021,200 B2
(45) Date of Patent: *Jul. 10, 2018

(54) METHODS AND SYSTEMS FOR ACTIVITY-BASED RECOMMENDATIONS

(71) Applicant: eBay Inc., San Jose, CA (US)

(72) Inventors: Harshal Ulhas Deo, San Jose, CA (US); Kavita Ganesan, San Jose, CA (US); Monica Dhanaraj, San Jose, CA (US)

(73) Assignee: eBay Inc., San Jose, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 14/734,976

(22) Filed: Jun. 9, 2015

(65) Prior Publication Data

US 2015/0271282 A1   Sep. 24, 2015

Related U.S. Application Data

(63) Continuation of application No. 13/300,963, filed on Nov. 21, 2011, now Pat. No. 9,082,123, which is a continuation of application No. 12/238,190, filed on Sep. 25, 2008, now Pat. No. 8,086,480.

(51) Int. Cl.
| | |
|---|---|
| *H04L 29/08* | (2006.01) |
| *G06Q 30/00* | (2012.01) |
| *G06Q 30/02* | (2012.01) |
| *G06Q 30/06* | (2012.01) |

(52) U.S. Cl.
CPC ............ *H04L 67/22* (2013.01); *G06Q 30/00* (2013.01); *G06Q 30/0201* (2013.01); *G06Q 30/0204* (2013.01); *G06Q 30/0601* (2013.01); *H04L 67/306* (2013.01)

(58) Field of Classification Search
CPC ......... G06Q 10/00; G06Q 40/00; G06F 17/60
USPC ........................................................ 705/7.11
See application file for complete search history.

(56) References Cited

U.S. PATENT DOCUMENTS

| | | | |
|---|---|---|---|
| 6,041,311 | A | 3/2000 | Chislenko et al. |
| 7,072,886 | B2 | 7/2006 | Salmenkaita et al. |
| 7,689,457 | B2 | 3/2010 | Chan et al. |
| 7,809,601 | B2 | 10/2010 | Shaya et al. |

(Continued)

OTHER PUBLICATIONS

"U.S. Appl. No. 12/238,190, Notice of Allowability dated Nov. 3, 2011", 4 pgs.

(Continued)

*Primary Examiner* — Romain Jeanty
(74) *Attorney, Agent, or Firm* — Shook, Hardy & Bacon L.L.P.

(57) ABSTRACT

Embodiments of computer-implemented methods and systems for activity-based recommendations are described. One example embodiment includes receiving data indicating historical activities of a user community, the historical activities including historical activities of the target user, selecting a reference group of users from the user community based on analysis of the historical activities of the target user, receiving generally current time activities of the reference group of users, the generally current time activities including those activities that have occurred within a defined time window, and recommending items to the target user based on the generally current time activities of the reference group of users.

20 Claims, 15 Drawing Sheets

(56) References Cited

U.S. PATENT DOCUMENTS

| | | |
|---|---|---|
| 8,037,046 B2 * | 10/2011 | Udezue ............ G06F 17/30997 707/706 |
| 8,086,480 B2 | 12/2011 | Deo et al. |
| 8,200,527 B1 | 6/2012 | Thompson et al. |
| 9,082,123 B2 | 7/2015 | Deo et al. |
| 2010/0076857 A1 | 3/2010 | Deo et al. |
| 2012/0066028 A1 | 3/2012 | Deo et al. |

OTHER PUBLICATIONS

"U.S. Appl. No. 12/238,190, Notice of Allowability dated Nov. 8, 2011", 6 pgs.

"U.S. Appl. No. 12/238,190, Notice of Allowance dated Aug. 23, 2011", 23 pgs.

"U.S. Appl. No. 13/300,963, Examiner Interview Summary dated Nov. 3, 2014", 3 pgs.

"U.S. Appl. No. 13/300,963, Non Final Office Action dated Mar. 10, 2014", 11 pgs.

"U.S. Appl. No. 13/300,963, Non Final Office Action dated Aug. 25, 2014", 5 pgs.

"U.S. Appl. No. 13/300,963, Notice of Allowance dated Mar. 11, 2015", 8 pgs.

"U.S. Appl. No. 13/300,963, Response filed Jun. 5, 2014 to Non Final Office Action dated Mar. 10, 2014", 10 pgs.

"U.S. Appl. No. 13/300,963, Response filed Nov. 24, 2014 to Non Final Office Action dated Aug. 25, 2014", 17 pgs.

\* cited by examiner

Shopping Pal

CHECK OUT WHAT PEOPLE WITH YOUR TASTE ARE BIDDING ON!

RECOMMENDATIONS FOR USER: [OXFORD31FORD]  [SEARCH] [USERS] [HELP]  ☑ CACHED   SAVE

RECENT BIDS & BUYS
- 1875-CC SEATED LIBERTY HALF DOLLAR, NO RESERVE
- 1878 US LIBERTY SEATED HALF DOLLAR – EF/AU
- 1850-O SEATED LIBERTY HALF DOLLAR
- 1865-S VF SEATED LIBERTY HALF

INTERESTED IN THESE?

SIMILAR TASTE BUYERS
- NARROWGATEGARDE...
- SD_SKIPPER
- QUABBIN
- AKEES11
- 1RIFFER
- BLUESTRATOMAN
- QUASARCOMICS
- DANIELCEE2
- RMAYS33
- KD_1965

METHODS AND SYSTEMS FOR ACTIVITY-BASED RECOMMENDATIONS

RELATED APPLICATION

This application is a continuation of U.S. patent application Ser. No. 13/300,963, filed Nov. 21, 2011, which is a continuation of U.S. patent application Ser. No. 12/238,190, filed Sep. 25, 2008, and issued as U.S. Pat. No. 8,086,480 on Dec. 27, 2011, the benefit of priority of each of which is claimed hereby, and each are incorporated herein by reference in their entirety.

FIELD

This application relates generally to data processing, and more specifically to methods and systems for activity-based recommendations.

BACKGROUND

Within the context of Internet commerce, a user may be targeted with recommendations that are based on the products the user views, selects, or bids on. Oftentimes product-based recommendations systems generate recommendations that are unlikely to persuade the user to act upon the recommendations. For example, a user may place an item in his "shopping cart" and, in response, a product-based recommendation system may display the message, "People who bought this item also bought these items," followed by the recommended items. Because the shopping habits of other users who bought the recommended items may vary from the shopping habits of the targeted users, the targeted users may not have any interest in the recommended items.

BRIEF DESCRIPTION OF DRAWINGS

Embodiments are illustrated by way of example and not limitation in the figures of the accompanying drawings, in which like references indicate similar elements and in which:

FIG. 14 is a further user interface showing recommended items, in accordance with an example embodiment.

DETAILED DESCRIPTION

Figure 1:
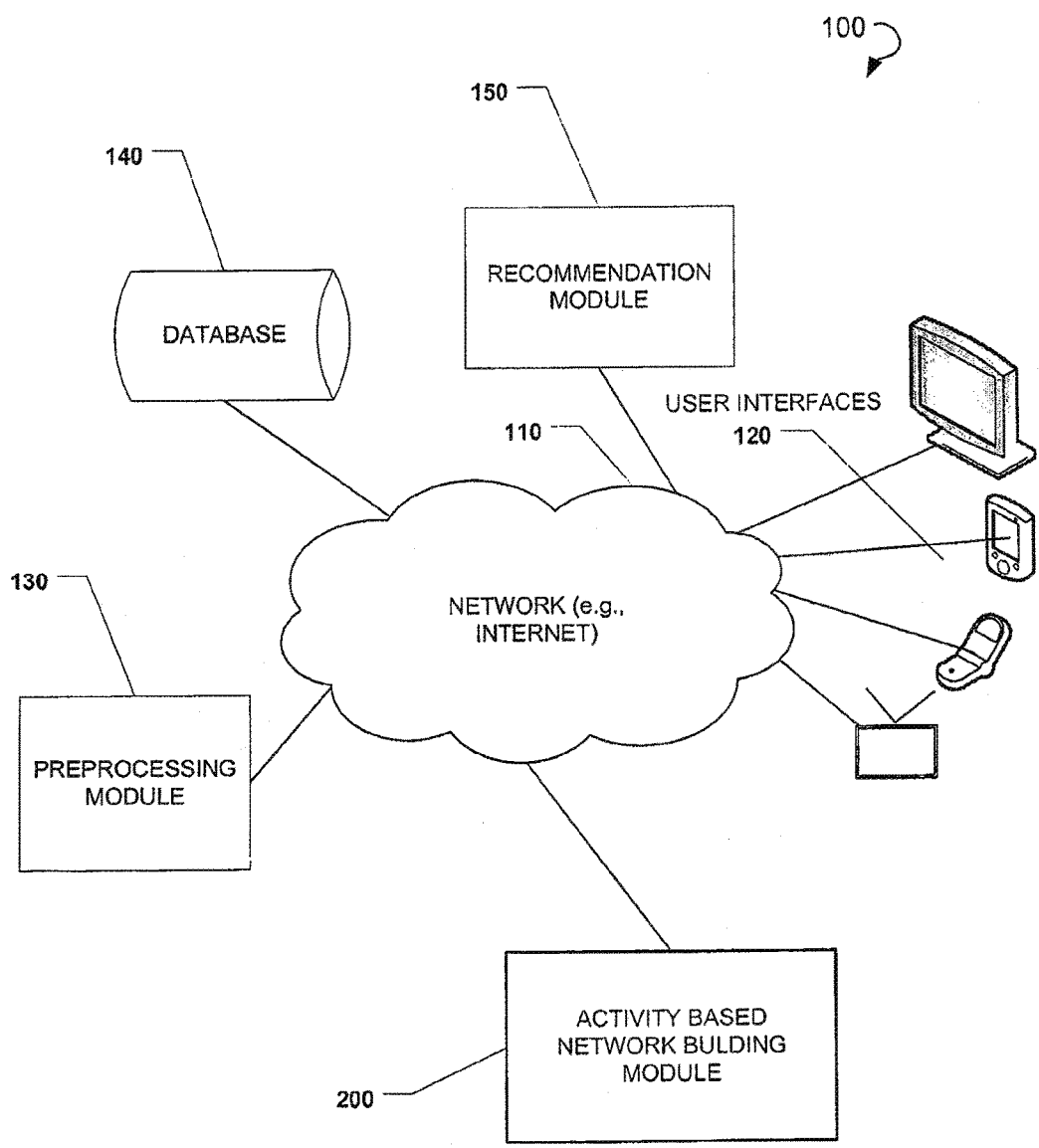
FIG. 1 is a block diagram illustrating an architecture within which methods and systems for activity-based recommendations are implemented, in accordance with an example embodiment.

Example methods and systems for delivering targeted recommendations to a user, based on the activities of a community of users, are described. The systems and methods for activity-based recommendations, in some example embodiments, may provide a user with real-time recommendations based on activities (e.g., searches, purchases, item selections, item postings) of other users in the user community. It will be understood that the activities are not limited to the examples provided and may include any action engaged by the user.

In accordance with an example embodiment, the system may analyze the activities undertaken by a user, and then associate that user with one or more other groups of users who have previously undertaken similar activities. By grouping users based on their activities, an Activity-Based Network (ABN) can be created. Accordingly, the system may recommend items to a target user when those items are currently popular with other users in the target user's ABN. The resulting real-time recommendations may be ranked based on user preference filters. A user may belong to more than one ABN. The user's ABN(s) may be defined by categorizing activities into activity clusters. The activity clusters may then be connected in order to represent the user's past activities.

Various methods may be utilized to define activity clusters. For example, when items are categorized and the user searches for the Burton brand snowboards, the activity may be clustered with other "Snowboarding" activities, which are defined as the top-level category for the items related to snowboarding (e.g., snowboards). When items are not categorized, a different approach may be utilized to define clusters for the activity graph. For example, if more than a predetermined percentage of users, after engaging in a first activity, proceed immediately to a second activity, the two activities may be clustered into one activity cluster of the activity graph. Regardless of the approach taken to create activity clusters, the clusters may be dynamically recreated based on changing categories or changing activity patterns.

A user's past activities may be monitored, recorded and then associated with one or more activity clusters. The activity clusters may be connected to create a user ABN. Other users whose activities are similarly classified as being within the user ABN may be associated with the ABN. Depending upon properties defined tier the ABNs, other users' activities may he in a different sequence with respect to the user activities. Furthermore, an ABN may include users whose activities are within a predetermined degree of separation of the user's activities. In some example embodiments, a user's most recent activities within the ABN may be given more weight than the user's older activities. In order to create a user's ABN(s) and generate recommendations, the user may need to be identified so that his past activities can be obtained.

Once one or more ABNs associated with a user are created, the systems and methods for activity-based recommendations may be utilized to generate recommendations based on the current activities of other users in the relevant ABN. Thus, if a large number of users from the relevant ABN are buying certain items, real-time recommendations suggesting the user buy the same items may be generated. An example architecture 100 in which the methods and systems for activity-based recommendations may be implemented is illustrated in FIG. 1.

As shown in FIG. 1, the architecture 100 may include a network 110, user interfaces 120, pre-processing module 130, a database 140, a recommendation module 150, and an activity-based network building module 200. The network 110 may be configured as a network of data processing nodes that are interconnected for the purpose of data communication (e.g., the Internet). The user interfaces 120 displayed on user devices (e.g., a computer monitor) and shown within the context of the architecture 100 may be configured to allow users to interact with the activity-based network building module 200 via the network 110. The user interfaces 120 may include a Graphical User Interface (GUI). The GUI, instead of offering only text menus or requiring typed commands, may utilize graphical icons, visual indicators or special graphical elements. The user interfaces 120 may be configured to utilize icons used in conjunction with text, labels or text navigation to fully represent the information and actions available to users.

The pre-processing module 130 may be configured to pre-process data received from the database 140. The data may indicate historical activities of the user community as well as the historical activities of a user being targeted with recommendations. The pre-processing module 130 may further receive near real-time data concerning real-time activities of the user community and the user will then be targeted with recommendations. The database 140, in some example embodiments, may be configured as a structured collection of records or data that is stored in a computer system so that a computer program or person using a query language may consult it to answer queries. The records retrieved in answer to queries include information that can be used to make decisions. The database 140 may include historical activities of users as well as user logins and profile information. An example database record is described in greater detail with reference to FIG. 12.

The recommendation module 150 may be configured to recommend items to the user being targeted for recommendations based on current activities of the users in one or more activity-based networks of the user. The activity-based network building module 200 may be configured to build one or more activity-based networks based on the historical activities of the user community. The activity-based networks may be utilized by the recommendation module 150 to provide real or near real-time item recommendations based on the activities of the users (e.g., searches, purchases, item selections, item postings) in the user activity-based network. Current activities of the other users in the user ABN may be ranked based on the target user's preference filters. Thus, the final recommendations displayed to the target user may be based on applying this filter. The activity-based network building module 200 is described with reference to FIG. 2.

Figure 2:
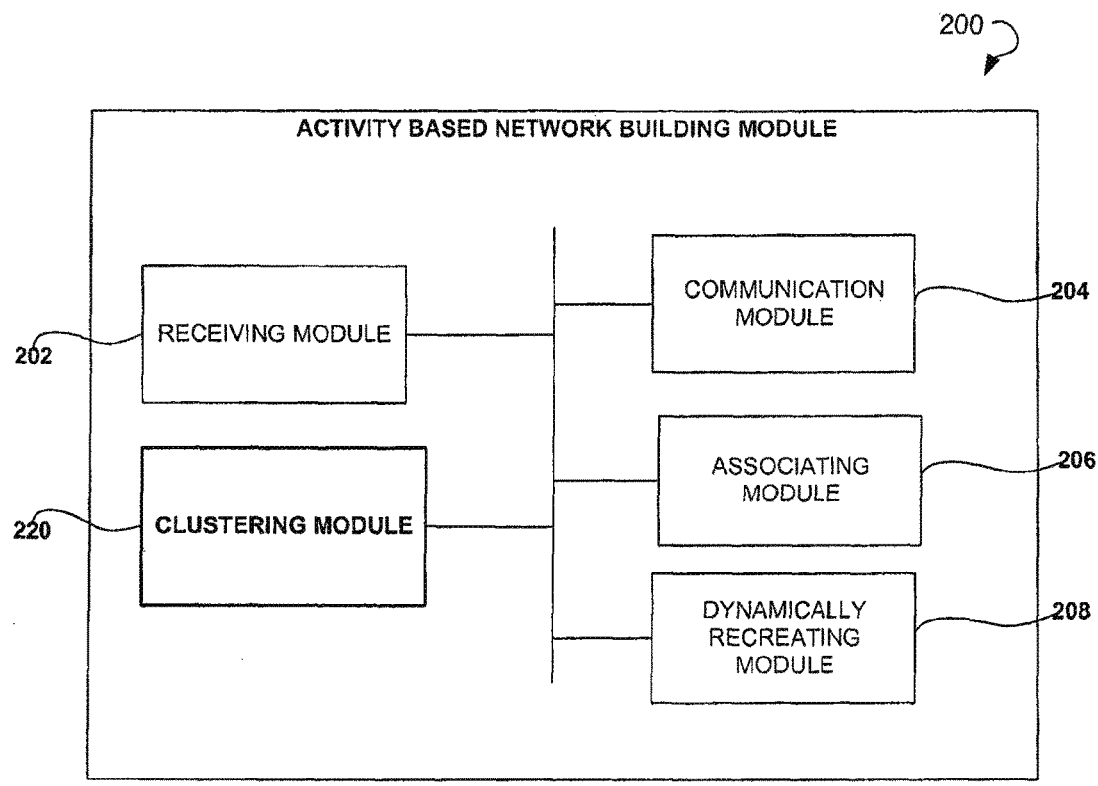
FIG. 2 is a block diagram illustrating an activity-based network building module, in accordance with an example embodiment.

FIG. 2 is a block diagram illustrating the activity-based network building module 200. As shown in FIG. 2, the activity-based network building module 200 may include a receiving module 202, a communication module 204, an associating module 206, a dynamically recreating module 208, and a clustering module 220. The receiving module 202 may be configured to receive data indicating the historical user activities of the user community from the database 140 shown in FIG. 1. The historical user activities may include those activities of the user who is being targeted with recommendations. When desirable, the receiving module 202 may only receive historical activities of the user community limited by a predetermined period of time (e.g., 100 days). The data received by the receiving module 202 may be utilized to build ABNs. A reference group may be selected from the users included in the ABN of the user being targeted with recommendations.

The communication module 204 may be configured to receive generally current time activities of other users from the user ABN. The generally current time activities may include activities within a defined time window (e.g., since 20 minutes ago). Since multiple activity-based networks may be defined for one target user, generally current time activities may be activities of a reference group selected from the most active ABN of the target user.

The associating module 206 may be configured to associate a reference group of users from one of the target user ABs with one or more of the activity clusters. The dynamically recreating module 208 may be configured to recreate or modify a user ABN when it is determined that the ABN needs to be updated. For example, a user may engage in an activity that cannot be classified within a node of the user's ABNs. As a result, the user's ABNs cannot be utilized to create recommendations for the user. The clustering module 220 may be configured to define clusters of the historical activities with identifiable similarities. The clustering module 220 may be described in more detail with reference to FIG. 3.

Figure 3:
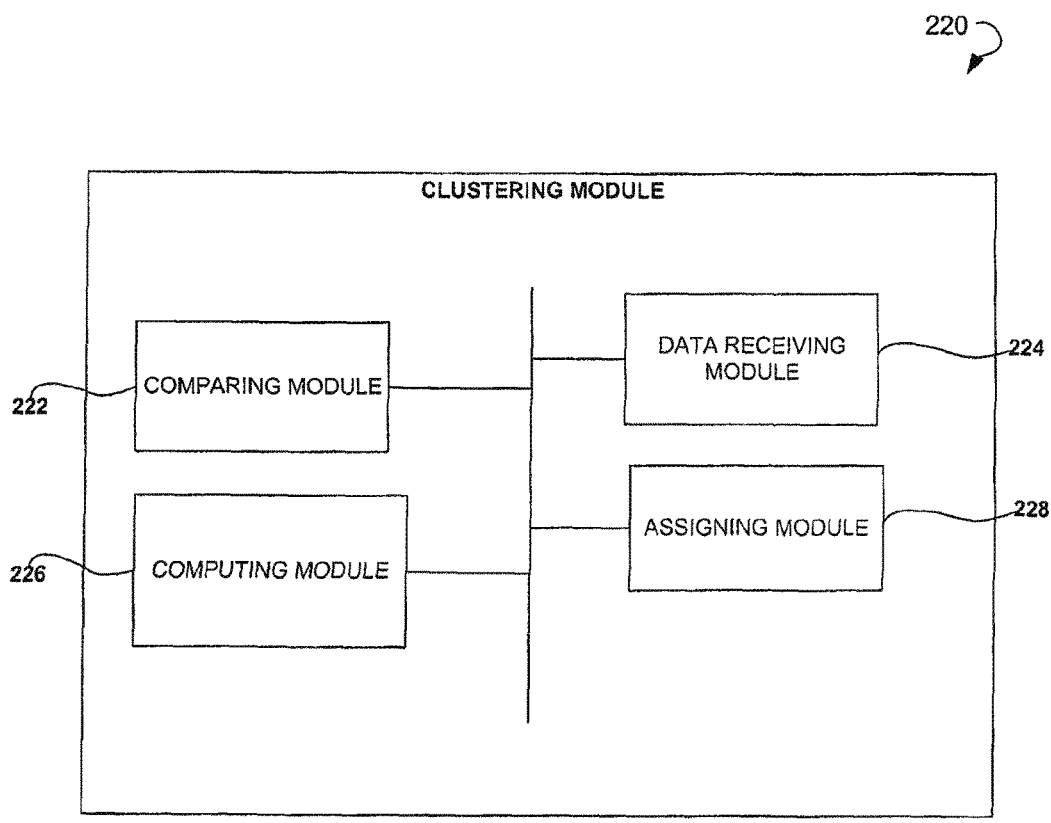
FIG. 3 is a block diagram illustrating a clustering module, in accordance with an example embodiment.

FIG. 3 is a block diagram illustrating the clustering module 220. As shown in FIG. 3, the clustering module 220 may include a comparing module 222, a data receiving module 224, a computing module 226, and an assigning module 228. In one example embodiment, clustering module 220 may be configured to associate the historical activities in predetermined subcategories with predetermined categories. In a further example embodiment, clustering module 220 may be configured to associate first historical activities of the user community with subsequent historical activities based on a predetermined relationship between the first and the subsequent historical activities. For example, when twenty percent of the users engaging in the first activity subsequently proceed to engage in the second activity, both the first and second activities may be associated in one activity cluster. Furthermore, the clustering module 220 may be configured to assign users from the user community to corresponding activity clusters from the multiple activity clusters based on the historical activities of the users.

As already mentioned above, an activity cluster may be formed by the comparing module 222 comparing, to a predetermined value, a ratio representing the percentage of users who, after performing a first identifiable activity, performed a second identifiable activity. The clustering module 220 may be configured to selectively cluster the first identifiable activity with the second identifiable activity to produce an activity cluster based on the ratio being above a defined threshold.

The computing module 226 may be configured to assist the comparing module 222 in computing a ratio of the second group of users to the first group of users. Once the comparing module decides which activities are to be associated with a cluster, the assigning module 228 may be configured to assign a new activity to an existing cluster. If it is determined that a new activity cannot be associated with any of the existing activity clusters, a new activity cluster may be started.

In some example embodiments, before the historical data received by the receiving module 202 shown with respect to FIG. 2 can be utilized by the clustering module 220 to determine nodes of ABNs, the historical data may be pre-processed by the pre-processing module 130 in order to facilitate creation of the activity clusters. The pre-processing module 130 is described with reference to FIG. 4.

Figure 4:
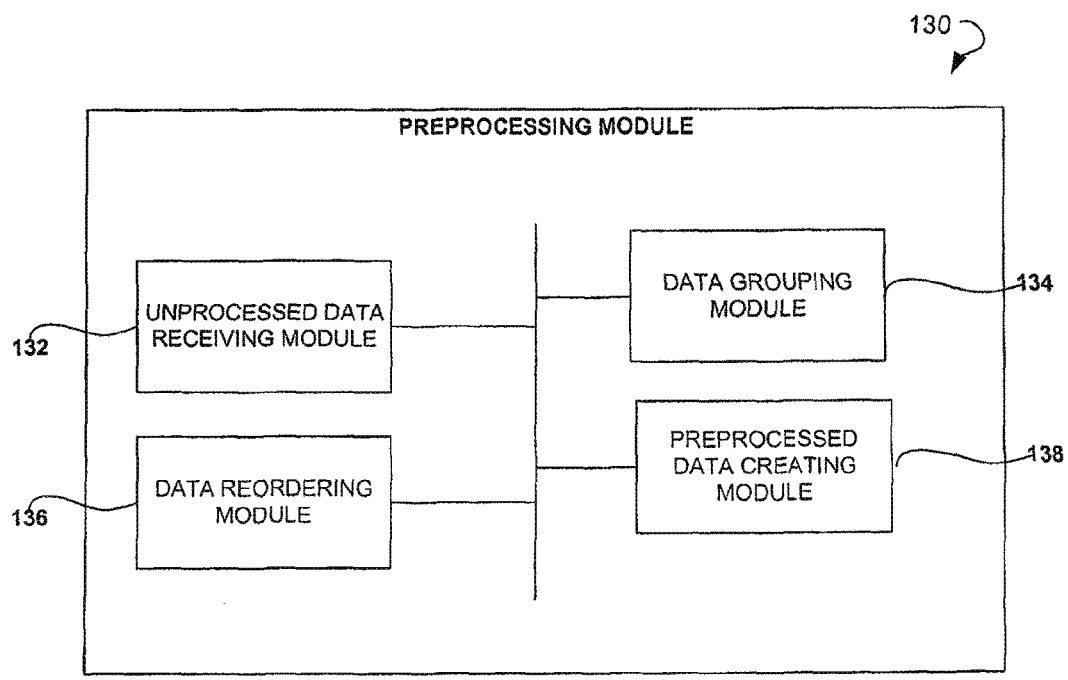
FIG. 4 is a block diagram illustrating a pre-processing module, in accordance with an example embodiment.

FIG. 4 is a block diagram illustrating the pre-processing module 130. As shown in FIG. 4, the clustering pre-processing module 130 may include an unprocessed data receiving module 132, a data grouping module 134, a data reordering module 136, and a pre-processed data creating module 138. The unprocessed data receiving module 132 may be configured to receive unprocessed historical activity data from the database 140. The data grouping module 134 may be configured to group the unprocessed historical activity data in order to facilitate clustering of the historical activities. The data reordering module 136 may be configured to reorder the historical activities in line with pre-defined data groups and the data creating module 138 may be configured to create new data based on the unprocessed data received by the unprocessed data receiving module 132.

Figure 5:
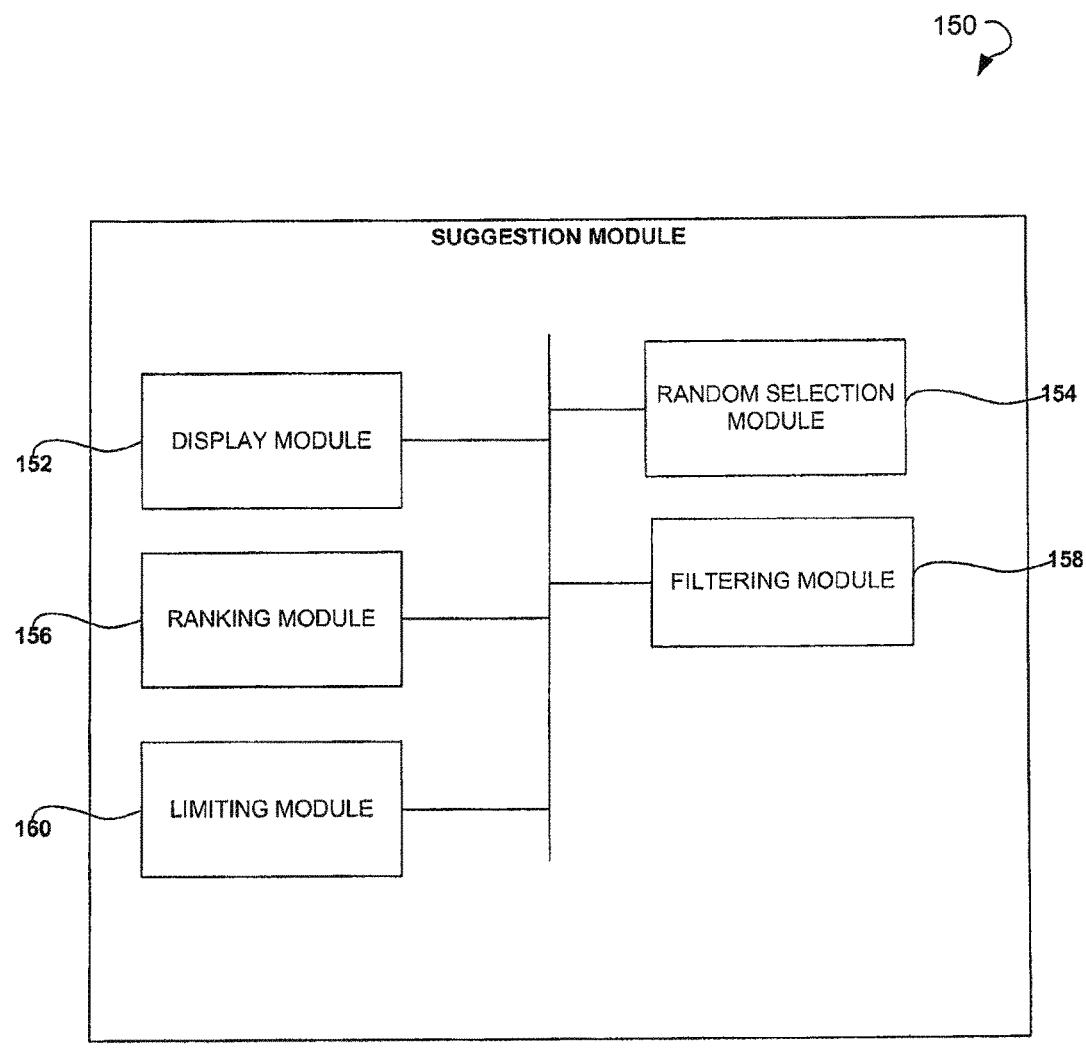
FIG. 5 is a block diagram illustrating a recommendation in accordance with an example embodiment.

In some example embodiments, the recommendation module 150 may be utilized to recommend items to a target user based on the activities of other users in the user's ABNs. The recommendation module 150 is described with reference to FIG. 5. FIG. 5 is a block diagram illustrating the recommendation module 150. As shown in FIG. 5, the recommendation module 150 may include a display module 152, a random selection module 154, a ranking module 156, a filtering module 158, and a limiting module 160.

Some conventional recommendation systems may generate a related item list by identifying items that have been categorized in related categories. For example, a user may bid on a specific item (e.g., tennis balls). For this specific item, a system may recommend an item in a related category (e.g., tennis racquets). This approach is product based and is entirety dependent upon system-defined categories. In contrast to these conventional recommendation systems, the systems and methods for activity-based recommendations base recommendations on a user's activity history, and the activity history of others in the user community. For example, if a user is looking at a video game but a certain number of other users in the user activity network are bidding on a Rolex watch, a recommendation may be generated that targets the user with a Rolex watch even though there is no apparent connection between the video game and the Rolex watch. This approach may be beneficial to, but not limited to, the case of a marketplace where no product categories are defined (e.g., a catalogue) because it permits making relevant recommendations even though relationships between items cannot be easily ascertained. However, when recommendations are based on what other users in the user's ABN are doing, the user may need to be identified.

Referring to FIG. 5, the recommendation module 150 may be configured to recommend items to the target user based on the generally current time activities of the reference group. The recommendation module 150 may be configured to recommend items based on the generally current time activities of users selected from the reference group according to a predetermined algorithm. Furthermore, the number of items recommended to the target user can be predetermined as well. In some example embodiments, more recent activities of the reference group may be given more weight in recommending items to the target user than the activities that are not as recent.

The display module 152 may be configured to display recommended items to the target user. The display module 152 may be represented by a conventional computer or TV monitor or a screen of a mobile device. The random selection module 154 may be configured to randomly select items related to generally current activities of other users from the user's ABN. These items may also be selected based on a defined algorithm such as, for example, selecting the top twenty currently popular items in the user's ABN. The ranking module 156 may be configured to determine the popularity of the items in the ABN. Furthermore, the items may be filtered based on the user preferences by the filtering module 158, which may be configured to filter out the items that are not in the preference list of the user. The limiting module 160 may be configured to limit the number of displayed recommendations to a predetermined number (e.g., 20 items).

An example method for activity-based recommendations is described with reference to FIG. 6. The method 600 may be performed by processing logic that may comprise hardware (e.g., dedicated logic, programmable logic, microcode, etc.), software (such as executes on a general purpose computer system or a dedicated machine), or a combination of both. In one example embodiment, the processing logic resides at the activity-based network building module 200 illustrated in FIG. 2. The method 600 may be performed by the various modules discussed above with reference to FIG. 2. Each of these modules may comprise processing logic.

Figure 6:
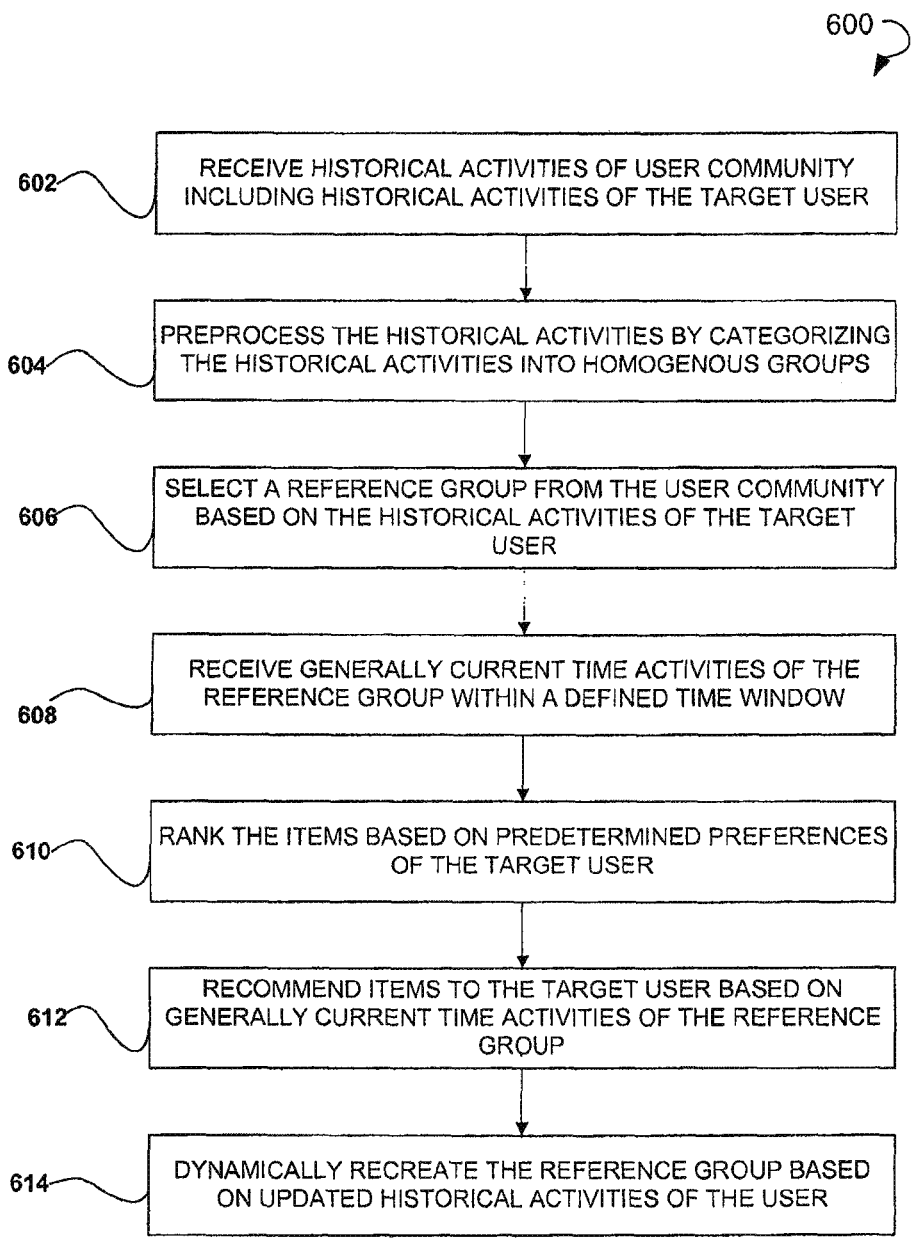
FIG. 6 is a flow chart illustrating a method for activity-based recommendations, in accordance with an example embodiment.

As shown in FIG. 6, the method 600 may commence at operation 602 with the receiving module 202 of the activity-based network building module 200 receiving data indicating historical activities of the user community. The historical activities received by the receiving module 202 may include historical activities of the target user. The historical activities received by the receiving module 202 may be further processed by the pre-processing module 130 shown in FIG. 4 at operation 604. The pre-processing performed at operation 604 may include categorizing the historical activities into groups of homogeneous data.

At operation 606, the associating module 206 of the activity-based network building module 200 shown in FIG. 2 may select a reference group of users from the user community based on the historical activities of the target user and the historical activities of the user community. An example method of forming a reference group is described in more detail with reference to FIG. 8. At operation 608, the communication module 204 may receive generally current time activities. In some example embodiments, generally current time activities may be defined as activities within a defined time window (e.g., last one hour). At operation 610, the generally current time activities of the other users in the target user ABN may he ranked based on predetermined preferences of the target user. At operation 612, the recommendation module 150 may recommend items to the target user based on generally current time activities of the reference group and the ranking of the activities. At operation 614, the dynamically recreating module may recreate the reference group based on updated historical activities of the target user. Example methods for ranking of the recommended items as well as recommending the items to a target user is described in more detail with reference to FIGS. 9, 10, and 11.

Figure 7:
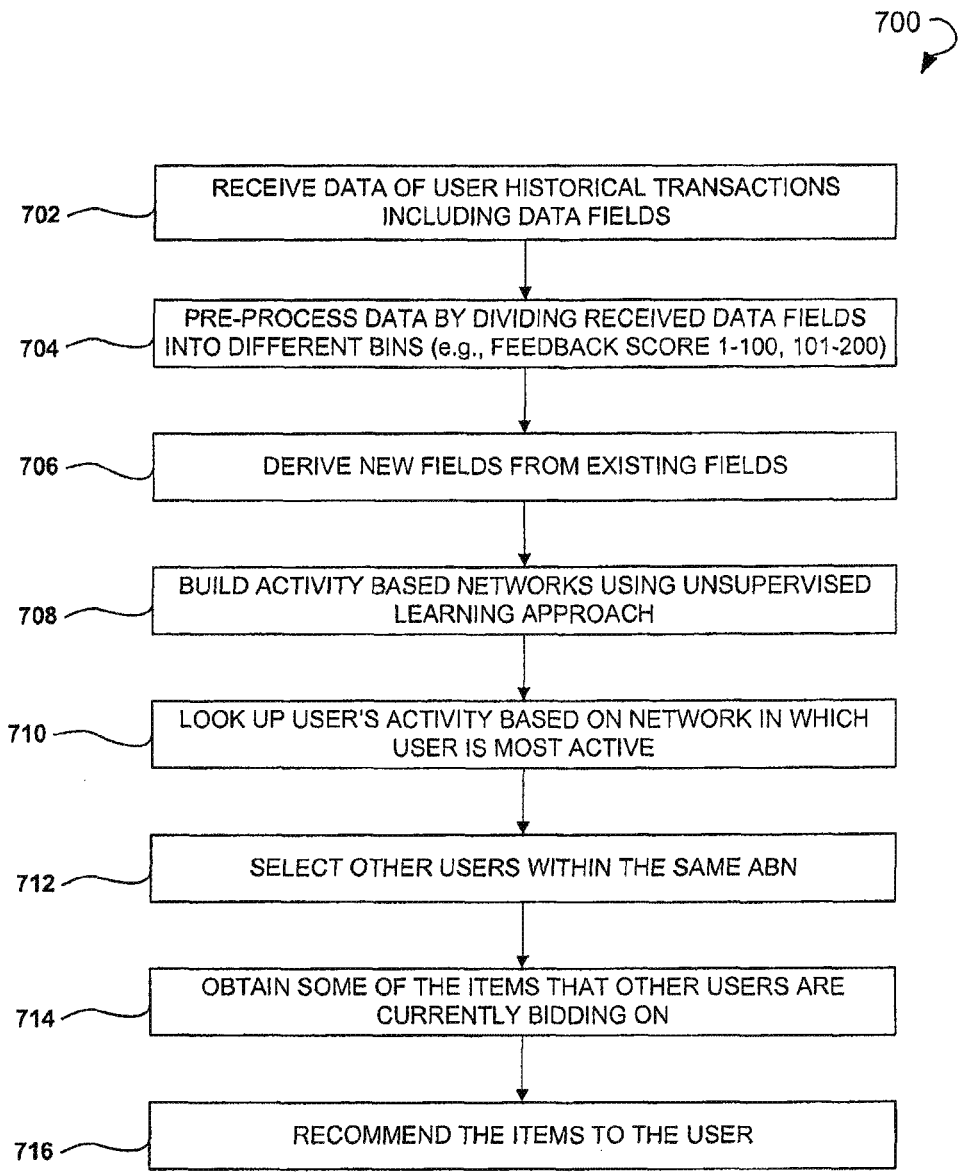
FIG. 7 is a flow chart illustrating a further method for activity-based recommendations, in accordance with an example embodiment.

A further example method for activity-based recommendations is described with reference to FIG. 7. As shown in FIG. 7, the method 700 may commence at operation 702 with the receiving module 202 of the activity-based network building module 200 receiving data related to the user's historical transactions. The data may include data fields (e.g., a feedback score). The data may be informative of user marketplace behavior such as buying and/or bidding patterns, user feedback score, user price ranges, and items viewed.

In some example embodiments, target users' data in the predefined past period of time may be Obtained from database 140. For example, data from January-March (three-month window) may be obtained. The data may include fields such as user ID, item ID, and leaf category ID. Within the context of an online marketplace there may exist various top level categories of items such as books. The books category may further include subcategories, for example, fiction or science. A leaf category ID may represent the last node in a category. Other example fields may include a seller feedback score, buyer feedback score, or item price.

The fields included in the data received by the unprocessed data receiving module 132 at operation 702 may be pre-processed at operation 704 by dividing the received data fields into different bins (e.g., feedback score of 1-100, 101-200). Pre-processing may permit creating new data from the unprocessed data. Thus, for example, users IDs may not need to be pre-processed because they are already discrete but the feedback can have any score that needs to be categorized into feedback ranges. The data that is not already in a discrete form may be placed in different bin categories. For example, seller feedback score 1-100 goes into bin one and seller feedback score 101-300 goes into bin two. New data may be derived from the existing data. The new data may be used as input to build the user ABN. An example set of new data categories may include a leaf category ID, a seller feedback score bin, a buyer feedback score bin, an item price bin, and a leaf category count (how many bids a user has for a given leaf category). Additional or other fields may be used. In addition to defining new data, pre-processing performed at operation 704 permits filtering out unnecessary data.

Accordingly, at operation 706 new fields may be derived from the existing fields. In some example embodiments, a weight may be assigned to give priority to different fields of data. At operation 708, the data grouping module 134 may be utilized to build activity-based networks using a clustering algorithm, for example, such as an unsupervised learning approach (e.g., K-MEANS algorithm). The grouping module 134 may utilize new fields as well as the existing fields like the leaf category ID to be provided as input for a clustering algorithm. The grouping module 134 may utilize a clustering algorithm that analyzes the fields and forms clusters. The clusters may be utilized as building blocks of an activity-based network. A clustering algorithm such as K-MEANS algorithm may be provided with a desired number of networks to be built based on the data provided.

As already mentioned above, at operation 708, an activity-based network may be built using an unsupervised learning approach such as the K-MEANS algorithm. K-MEANS permits clustering user activity attributes or features into K numbers of a group where is a positive integer number. The grouping may be done by minimizing the sum of squares of distances between data and the corresponding cluster centroid. Accordingly, K is the number of ABNs to be created.

The K-MEANS algorithm is an algorithm to cluster n objects based on attributes into k partitions, k<n. It is similar to the expectation-maximization algorithm for mixtures of Gaussians in that they both attempt to find the centers of natural clusters in the data. It assumes that the object attributes form a vector space. Depending on how the data is grouped, users can appear in more than one ABN. The K-means algorithm may make use of all input data obtained to make the calculated groupings.

At operation 710, an ABN in which the user is most active may be looked up in order to generate real time recommendations and at operation 712, within the same ABN select (randomly or on some other basis) users may be selected. At operation 714, some of the items that other users are currently bidding on may be obtained and at operation 716, the items may be recommended to the user. For example for a given user, the user's ABN may be looked up to determine the ABN to which the user belongs. The user may appear in multiple ABNs. However, only the ABN in which the user is most active may be utilized.

At operation 712, the random selection module 154 may select a few other users randomly or according to a predetermined method. At operation 714, some of the items that these users are currently bidding on may be obtained and then recommended to the target user. Thus, the systems and methods for activity-based recommendations may provide real time item recommendations based on bid and/or search activities of other users in the user's ABN and rank the results based on the user's preference filters. Thus, user's preference for attributes such as a power seller level, shipping costs, image count, and auction format may be accounted for in making the recommendations.

Figure 8:
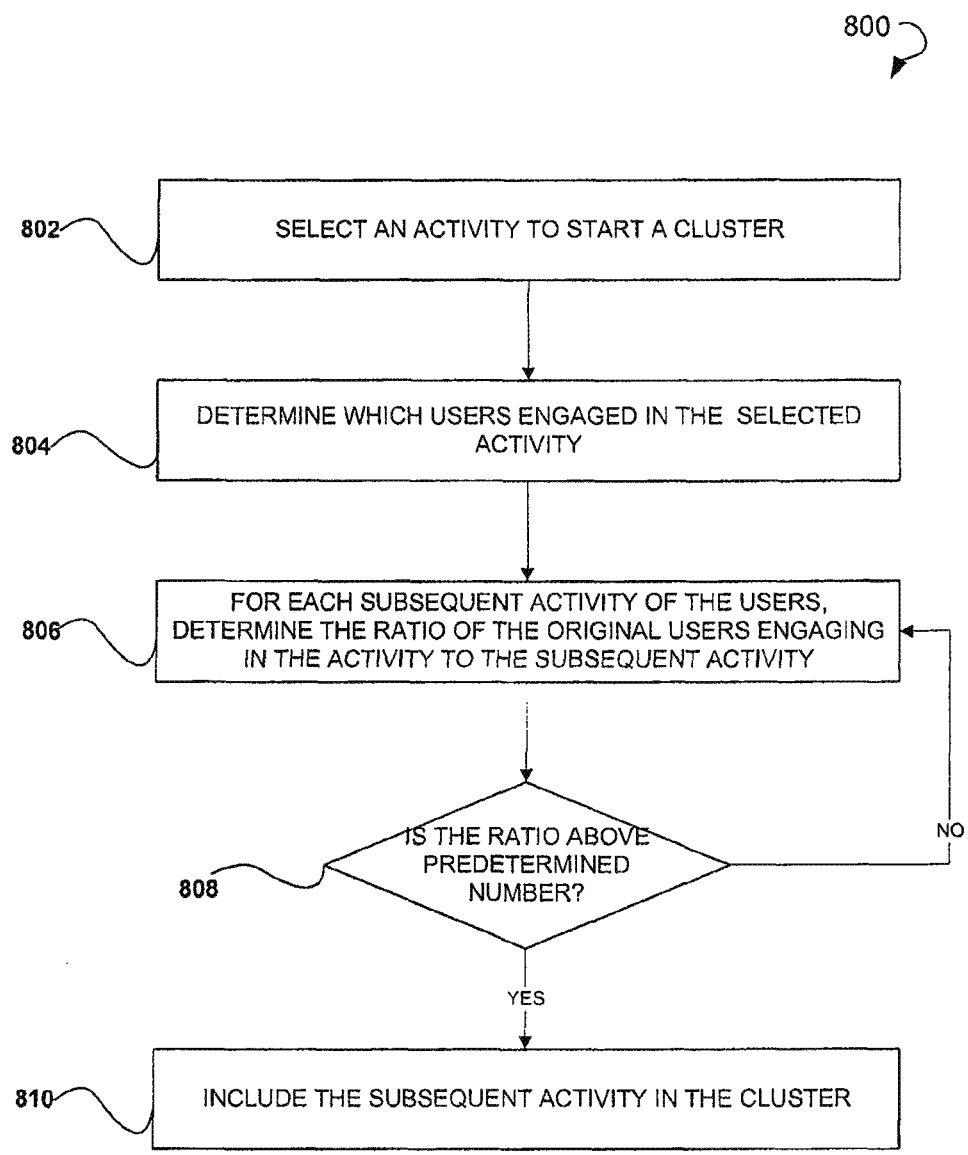
FIG. 8 is a flow chart illustrating a method for dynamic demand based category clustering, in accordance with an example embodiment.

An example method for dynamic demand based category clustering is described with reference to FIG. 8. As shown in FIG. 8, the method 800 may commence at operation 802 with the clustering module 220 selecting a category of activities to start a cluster. In one example embodiment, the reference group may be formed by defining multiple clusters of the historical activities with identifiable similarities from which nodes of the user ABN may be formed. Based on the historical activities of the target user, the user ABN may be created by selecting appropriate clusters.

The reference group may be defined by selecting users from the user community with historical activities related to the user ABN. The degree of the relationship may be predefined. Thus, in some example embodiments, only those users from the user community whose activities coincide with the activities of the target user may be included in the ABN. In other example embodiments, a predefined degree of separation from the clusters of the ABN may be permitted.

In some example embodiments, formation of clusters of the target user ABN may include receiving a first group of identifiable activities associated with a first group of users by the data receiving module 224 of the clustering module 220. The data receiving module 224 of the clustering module 220 may also receive a second group of identifiable activities also associated with the first group of users. For example, the second group of activities may be activity the first group of users engages in subsequent to the first group of identifiable activities. The computing module 226 of the clustering module 220 may compute the ratio of the second group of users to the first group of users to determine the percentage of users engaging in the second group of activities subsequent to engaging in the first group of activities.

The comparing module 222 of the clustering module 220 may compare the ratio to a predetermined threshold. For example, the threshold may be set to 20 percent. The assigning module 228 of the clustering module 220 may assign activities from the second group of activities to the same cluster as the activities from the first group of activities if more than twenty percent (or some other predefined percentage) of the users engage in the second group of activities subsequent to the first group of activities. Thus, the two groups of activities may be associated in one activity cluster. This approach permits creating clusters where no inventory or pre-existing classification of items exists.

Accordingly, at operation 804, the clustering module 220 may determine which users engage in the selected activities and at operation 806, for each subsequent activity of the users, the clustering module 220 may establish the percentage of the original users engaging in the activity. At decision block 808, the clustering module 220 may determine whether or not the percentage is above a predetermined number. If the clustering module 220 determines that the percentage is above the predetermined number, at operation 810, the subsequent category may be included in the cluster, if, on the other hand the clustering module 220 determines that that the percentage is not above the predetermined number, the subsequent category may not be included in the activity cluster.

In some example embodiments, dynamic demand based category clustering may commence by determining all users who had activity (e.g., bid/ search) in a first category (e.g., women's shoes). The users' next activity may be plotted by category. Thus, a tail of activities may be established. For example, fifteen percent of users may have subsequent activity in women's tops, twelve percent in handbags and then the rest is spread across hundreds of other leaf categories. Accordingly, each leaf category itself may have only a small percentage (e.g., one to two percent) of users falling in that "bucket". This trend may be used to group the top categories as related categories. An algorithm may be initiated starting with the top category for the next activity and keep selecting the subsequent category as long its user count is within some percentage of the top category. An example method for forming activity-based networks is described with reference to FIG. 9.

Figure 9:
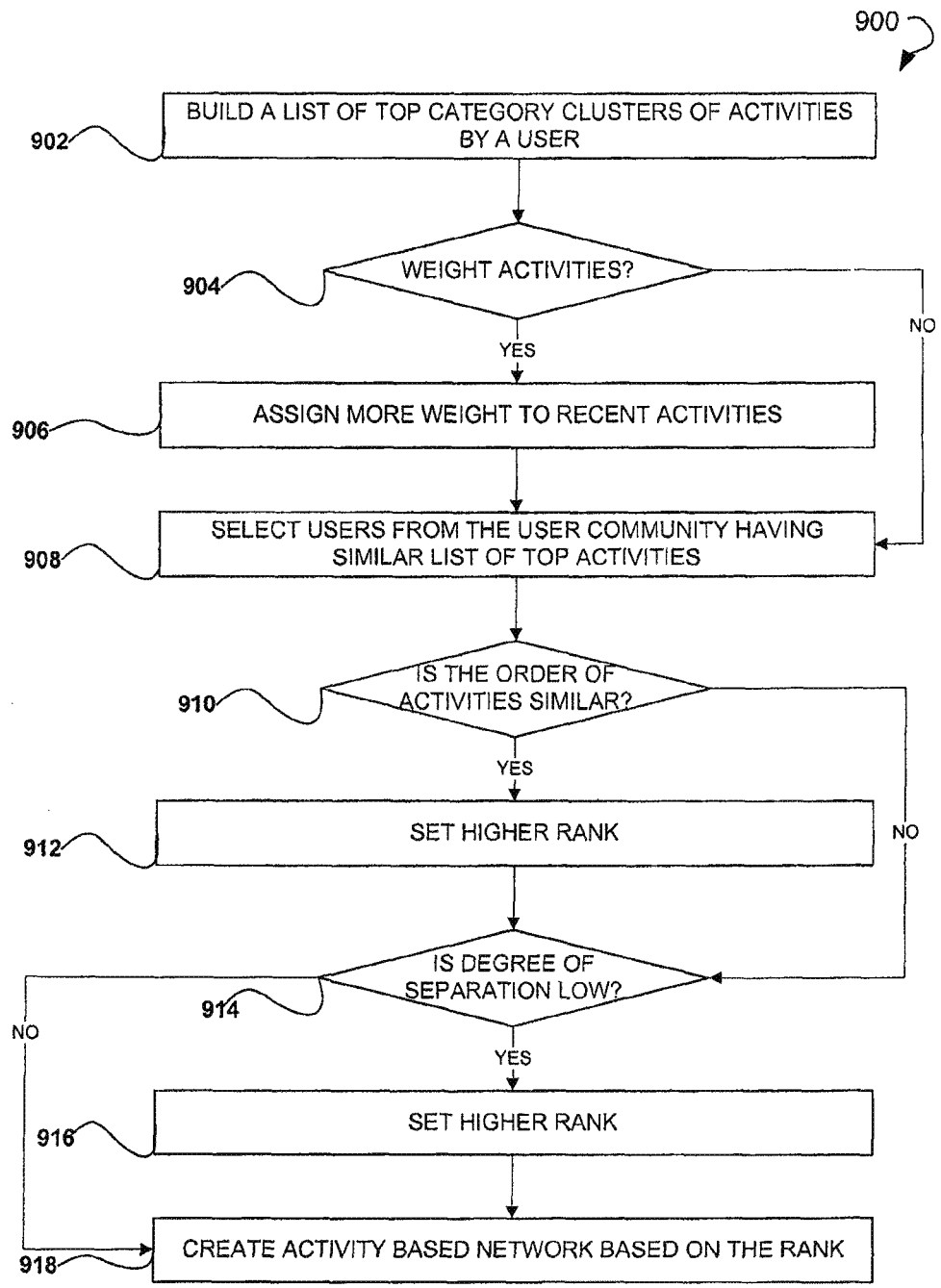
FIG. 9 is a flow chart illustrating a method for forming activity-based networks, in accordance with an example embodiment.

As shown in FIG. 9, the method 900 may commence at operation 902 with building a list of top category clusters of activities by a user. At decision block 904, it may be determined whether the activities are to be weighted giving more weight to more recent activities. If it is determined at decision block 904 that the activities should be weighted, at operation 906 more weight may be assigned to more recent activities. If, on the other hand, it is determined that the activities are not weighted, no weight will be assigned to activities that are more recent. At operation 908, users may be selected from the user community having a similar list of top activities. At decision block 910 it may be determined whether the order of the historical activities by other users is similar to the order of the user historical activities. If it is determined that the order of the activities is similar, the users may be ranked higher at operation 912.

At decision block 914, it may be determined whether the degree of separation between activities of the other users and the activities of the target user is lower than a predetermined number. If it is determined that the degree is lower than the predetermined number, a higher rank may be set. At operation 918, an activity-based network may be set based on the rankings. In some example embodiments, forming an activity-based network using activity clusters may include building a list of top category clusters in which the user is interested.

Figure 10:
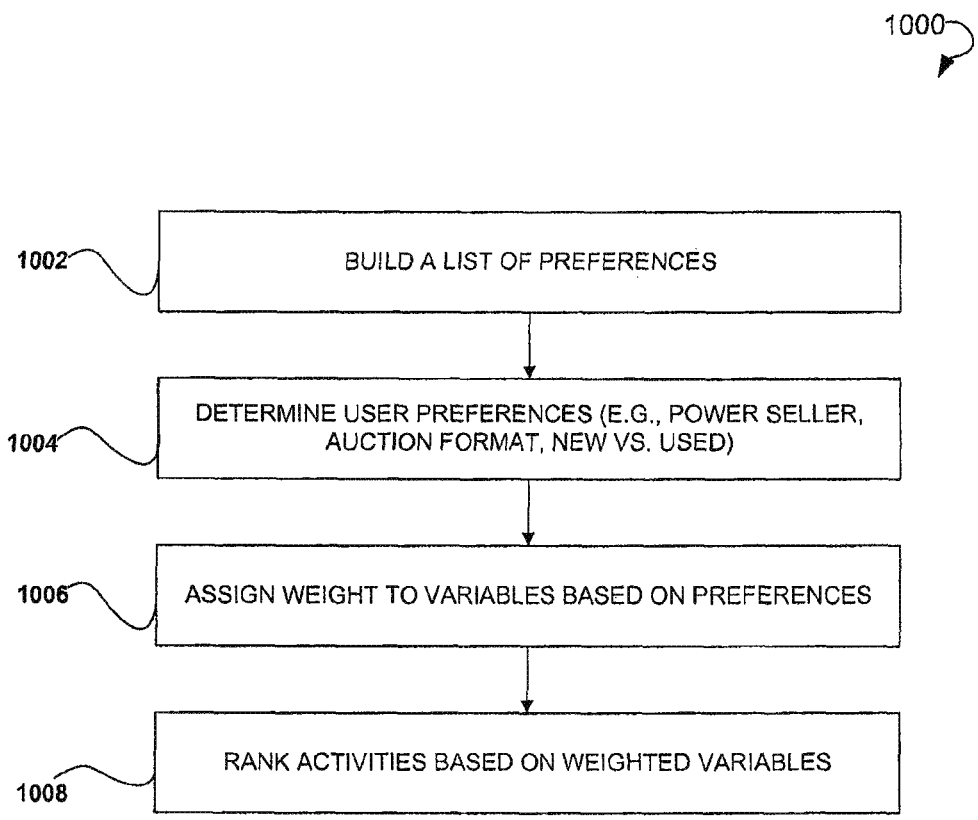
FIG. 10 is a flow chart illustrating a method for preference filtering, in accordance with an example embodiment.

An example method for preference filtering is described with reference to FIG. 10. As shown in FIG. 10, the method 1000 may commence at operation 1002 with the filtering module 158 building a list of preferences. Thus, a list of variables that a user may show preference towards may be built by the filtering module 158. Based on historical activity data a weight system may be built giving individual variables a weight (e.g., between 0 and 1). Accordingly, at operation 1004 the filtering module may determine user preferences and apply filtering based on the user preferences. At operation 1006 a weight may be assigned to variables based on the preferences and at operation 1008, activities may be ranked based on the weighted variables. An example method for capturing recent activities is described with reference to FIG. 11.

Figure 11:
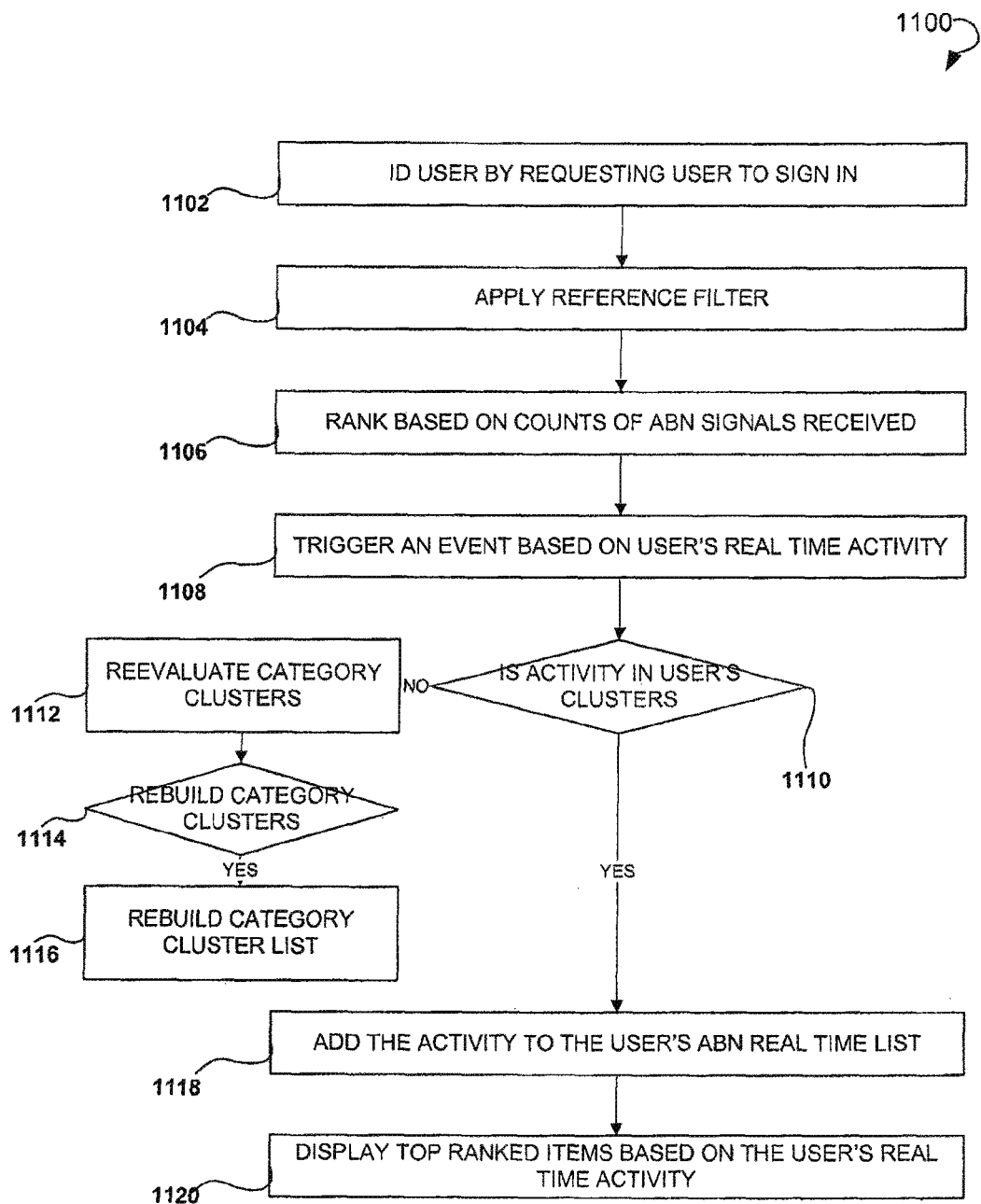
FIG. 11 is a flow chart illustrating a method for capturing recent activities, in accordance with an example embodiment.

As shown in FIG. 11, the method 1100 may commence at operation 1102 with identifying a user by requesting the user to sign in. At operation 1104, a reference filter may be applied and at operation 1106, recommendations may be ranked based on the count of ABN signals received. At operation 1108, an event may be triggered based on the user's real time activity and at decision block 1110, it may be determined whether or not the activity is in the user's activity clusters. If it is determined at decision block 1100 that the activity is not in the user's activity clusters, the category clusters may be re-evaluated at operation 1112 and rebuilt at operation 1114. The category cluster list may be rebuilt as well at operation 1116. If on the other hand it is determined at operation 1110 that the activity is in the user's clusters, the activity may be added to the user's ABN real time list at operation 1118. Subsequently, at operation 1120, top ranked items based on the user's real time activities may be displayed.

A recent user activity may be captured by triggering a capturing event when the user bids on and/or views an item. While the user is engaged in the activity, an item may be added to the real time item list maintained for the user. A pre-check may be done to ensure that the item is from the category cluster list of the user. If not, a failure event may be generated. The failure events may be aggregated to re-evaluate the category cluster lists for this user and possibly signal rebuilding of category lists.

Real time recommendations may be displayed to the user subsequent to their creation. Thus, when a user signs in, the recommendation module 150 may obtain the ABN real time item lists and apply the preference filter to each list. The obtained item list may be ranked based on counts of ABN signals received. Top ranked items may be displayed to the target user.

Figure 12:
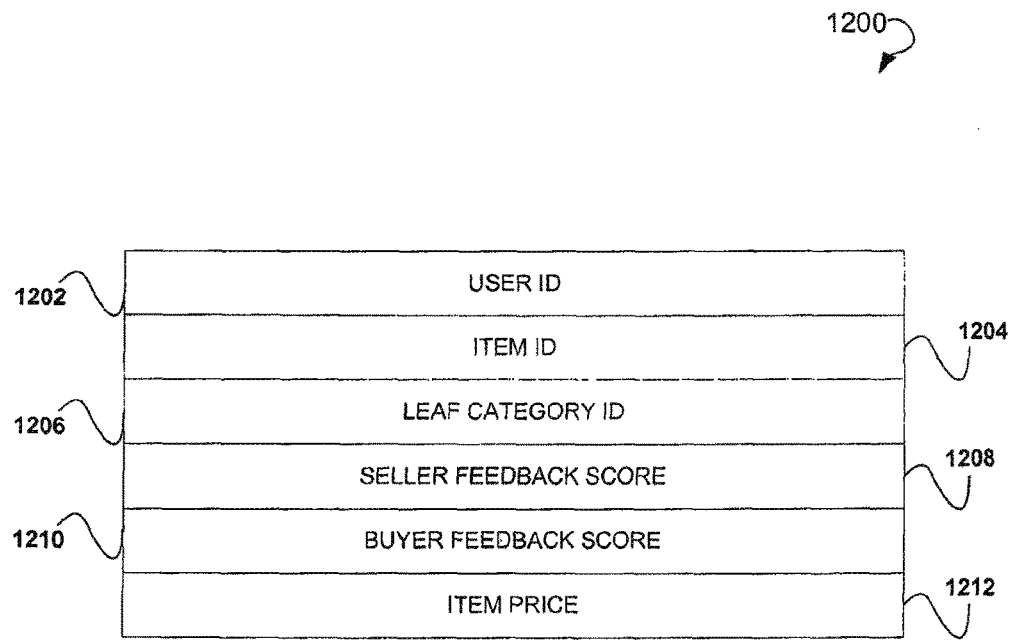
FIG. 12 is a block diagram illustrating a data record, in accordance with an example embodiment.

An example block diagram illustrating a data record is described with reference to FIG. 12. FIG. 12 illustrates an example database record of the database 140 described with reference in FIG. 1. The record may, in some example embodiments, include a user ID 1202, an item ID 1204, a leaf category ID 1206, a seller feedback score 1208, a buyer feedback score 1210, and an item price 1212.

The user ID 1202 may refer to a keyword user in computer security, logging (or signing) in and out is the process by which individual access to a computer system is controlled by identification of the user in order to obtain credentials to permit access. A user can log into a system to obtain access, and then log out when the access is no longer needed. Within the context of the present disclosure, the user may need to be identified in order to establish user's ABNs. Other fields may contain variables described above.

Figure 13:
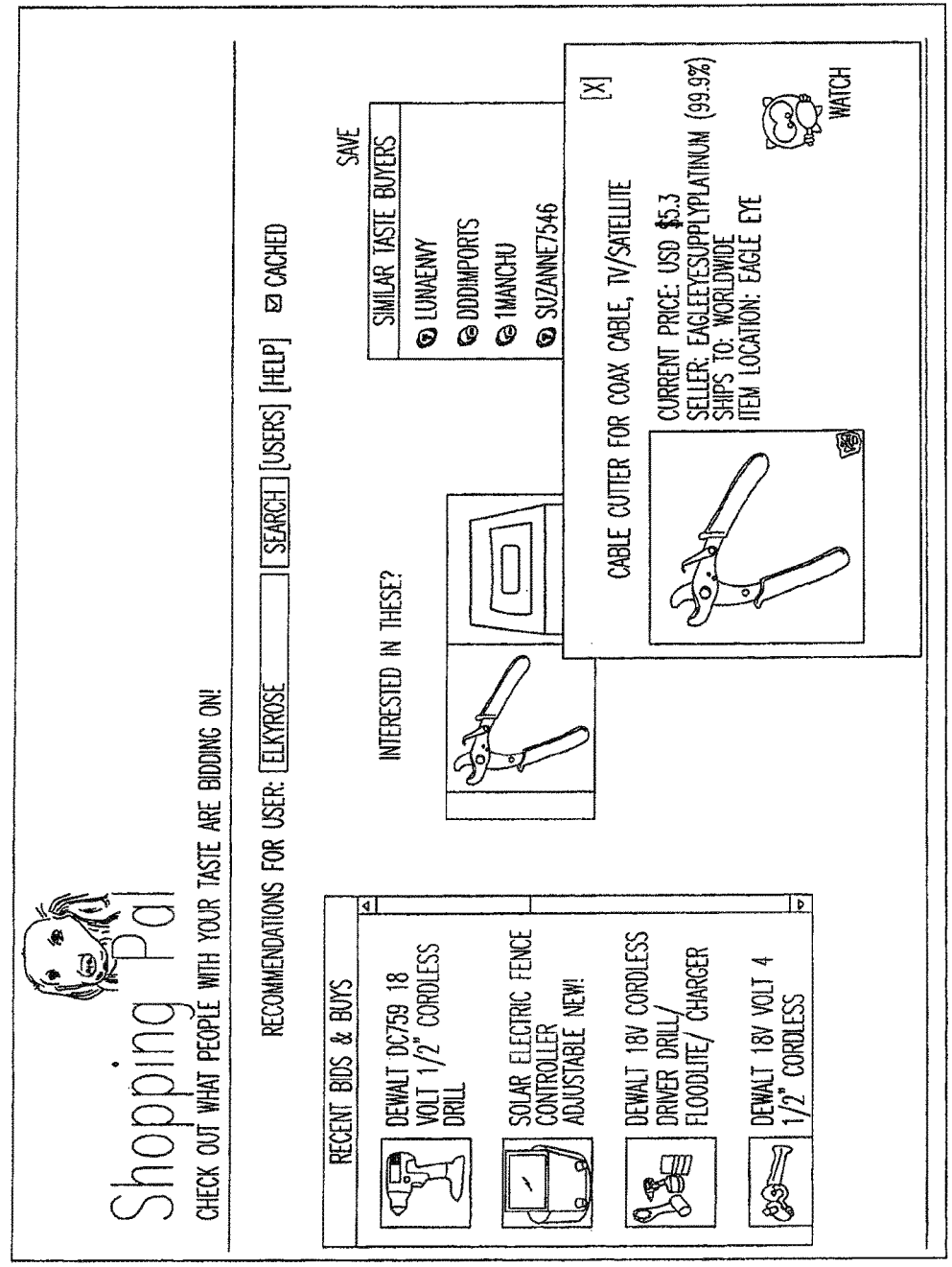
FIG. 13 is a user interface showing recommended items, in accordance with an example embodiment.

An example user interface showing recommended items is described with reference to FIG. 13. As shown in FIG. 13, the target user logs in with the user ID "elkyrose". Based on the target user ID, the user is identified. The user IDs of "similar taste buyers" which are the other users from the target user ABNs are displayed. The "Recent Bids &. Buys" section illustrates the items that are popular with the target user ABNs. Based on the analysis of the generally current activities of the users from the target user ABN and the personal preferences of the target user, the user is shown an item (a set of pliers) which are currently the most popular item in the target user's ABN. A further example user interface showing recommended items is described with reference to FIG. 14. Similarly to FIG. 13, FIG. 14 illustrates users from the target user's ABN as well as the most popular items in the targeted user ABN.

Figure 15:
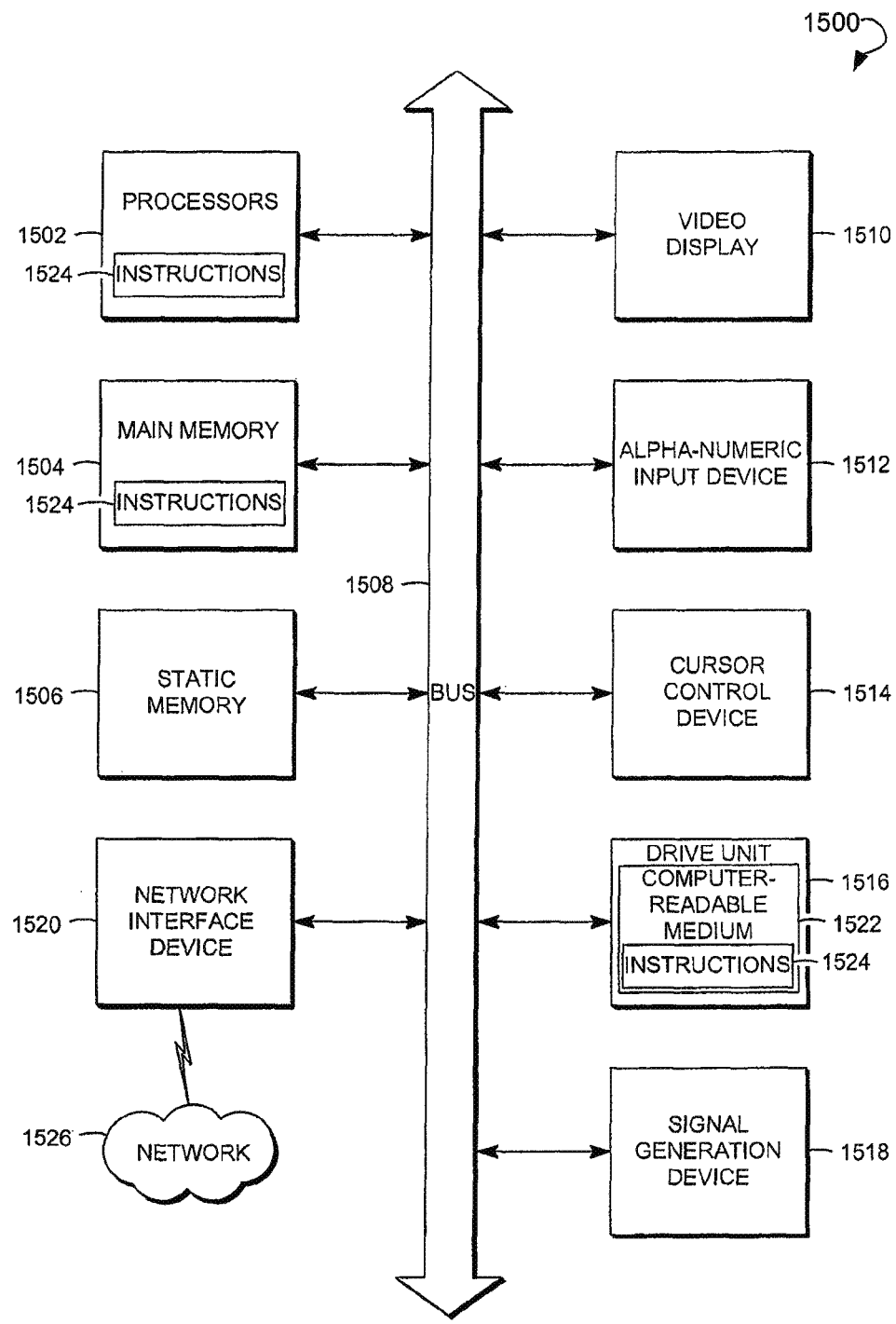
FIG. 15 is a diagrammatic representation of an example machine in the form of a computer system within which a set of instructions for causing the machine to perform any one or more of the methodologies discussed herein may be executed.

FIG. 15 shows a diagrammatic representation of a machine in the example electronic form of a computer system 1500, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also he taken to include any collection of machines that individually or jointly execute a set (or multiple sets) of instructions to perform any one or more of the methodologies discussed herein.

The example computer system 1500 includes a processor or multiple processors 1502 (e.g., a central processing unit (CPU), a graphics processing unit (GPU), or both), and a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1100 may also include an alphanumeric input device 1512 (e.g., a keyboard), a cursor control device 1514 (e.g., a mouse), a disk drive unit 1516, a signal generation device 1518 (e.g., a speaker) and a network interface device 1520.

The disk drive unit 1516 includes a computer-readable medium 1522 on which is stored one or more sets of instructions and data structures (e.g., instructions 1524) embodying or utilized by any one or more of the methodologies or functions described herein. The instructions 1524 may also reside, completely or at least partially, within the main memory 1504 and/or within the processors 1502 during execution thereof by the computer system 1500. The main memory 1504 and the processors 1502 may also constitute machine-readable media.

The instructions 1524 may further be transmitted or received over a network 1526 via the network interface device 1520 utilizing any one of a number of well-known transfer protocols (e.g., Hyper Text Transfer Protocol (HTTP)).

While the computer-readable medium 1522 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, methods and systems for activity-based recommendations have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A system comprising:
   a reception module executed by at least one of one or more processors of a machine to receive real-time action from a target user, the real-time action is not an action within an activity network of the target user;
   a cluster module executed by at least one of the one or more processors of the machine to re-categorize activity data indicating actions, including the real-time actions engaged by multiple users, into updated activity networks by performing an analysis of the activity data;
   an association module executed by at least one of the one or more processors of the machine to re-determine a subset of the multiple users that engaged in one or more actions categorized into the updated activity networks that includes the real-time action engaged by the target user; and
   a recommendation module executed by at least one of the one or more processors of the machine to rank a plurality of recommendations directed at the target user used on a count of activity signals received from the multiple users of the activity network, the activity signals include real-time actions from the multiple users, and provide the real-time ranked recommendations for display.

2. The system of claim 1, wherein: the recommendation module is further configured to rank the plurality of recommendations based on recent activities from the multiple users of the activity network.

3. The system of claim 1, wherein: the cluster module is configured to categorize the actions into the activity networks by analyzing historical data indicative of historical actions engaged by the multiple users.

4. The system of claim 1, wherein: the cluster module is configured to generate a representation of past activities of the target user by connecting a portion of the activity networks; and the recommendation module is configured to generate the recommendation directed at the target user based on the representation generated by the connecting of the portion of the activity networks.

5. The system of claim 1, wherein the re-categorizing of the actions into the updated activity networks is based on a determination that a percentage of the multiple users engaged in a first activity among the actions and in a second activity among the actions.

6. The system of claim 1, wherein: the cluster module is configured to re-categorize the actions into the updated activity networks based on the determination that the percentage of the multiple users engaged in the first activity prior to the second activity; and the association module is configured to re-determine the-subset of the multiple users based on a determination that the user engaged in the second activity prior to the first activity.

7. The system of claim 1, wherein the activity data indicates actions selected from a group consisting of searches, purchases, item selections, and item postings.

8. A method comprising:
by a reception module executed by at least one of one or more processors of a machine, receiving real-time action from a target user, the real-time action is not an action within an activity network of the target user;
by a cluster module executed by at least one of the one or more processors of the machine, re-categorizing activity data indicating actions, including the real-time actions engaged by multiple users, into updated activity networks by performing an analysis of the activity data;
by an association module executed by at least one of the one or more processors of the machine, re-determining a subset of the multiple users that engaged in one or more actions categorized into the updated activity networks that includes the real-time action engaged by the target user, the re-determining a subset of the multiple users being performed by a processor of a machine; and
by a recommendation module executed by at least one of the one or more processors of the machine, ranking a plurality of recommendations directed at the target user based on a count of activity signals received from the multiple users of the activity network, the activity signals include real-time actions from the multiple users, and providing the real-time ranked recommendations for display.

9. The method of claim 8, wherein the ranking the plurality of recommendations is based on recent activities from the multiple users of the activity network.

10. The method of claim 8, wherein the actions being categorized into the updated activity networks by analyzing historical data indicative of historical actions engaged by the multiple users.

11. The method of claim 8, further comprising: generating a representation of past activities of the target user by connecting a portion of the activity networks; and generating the recommendation directed at the target user based on the representation generated by the connecting of the portion of the activity networks.

12. The method of claim 8, wherein the re-categorizing of the actions into the updated activity networks is based on a determination that a percentage of the multiple users engaged in a first activity among the actions and in a second activity among the actions.

13. The method of claim 8, wherein: the re-categorizing the actions into the updated activity networks is based on the determination that the percentage of the multiple users engaged in the first activity prior to the second activity; and the re-determining the subset of the multiple users is based on a determination that the user engaged in the second activity prior to the first activity.

14. The method of claim 8, wherein the activity data indicates actions selected from a group consisting of searches, purchases, item selections, and item postings.

15. A machine-readable medium not having any transitory signals and storing instructions that, when executed by one or more processors of a machine, cause the machine to perform operations comprising:
by a reception module executed by at least one of the one or more processors of the machine, receiving real-time action from a target user, the real-time action is not an action within an activity network of the target user;
by a cluster module executed by at least one of the one or more processors of the machine, re-categorizing activity data indicating actions, including the real-time actions engaged by multiple users, into updated activity networks by performing an analysis of the activity data;
by an association module executed by at least one of the one or more processors of the machine, re-determining a subset of the multiple users that engaged in one or more actions categorized into the updated activity networks that includes the real-time action engaged by the target user; and
by a recommendation module executed by at least one of the one or more processors of the machine, ranking a plurality of recommendations directed at the target user based on a count of activity signals received from the multiple users of the activity network, the activity signals include real-time actions from the multiple users, and providing the real-time ranked recommendations for display.

16. The machine-readable medium of claim 15, wherein the ranking the plurality of recommendations is based on recent activities from the multiple users of the activity network.

17. The machine-readable medium of claim 15, wherein the actions being categorized into the updated activity networks by analyzing historical data indicative of historical actions engaged by the multiple users.

18. The machine-readable medium of claim 15, wherein the operations further comprise: generating a representation of past activities of the target user by connecting a portion of the activity networks; and generating the recommendation directed at the target user based on the representation generated by the connecting of the portion of the activity networks.

19. The machine-readable medium of claim 15, wherein the re-categorizing of the actions into the updated activity networks is based on a determination that a percentage of the multiple users engaged in a first activity among the actions and in a second activity among the actions.

20. The machine-readable medium of claim 15, wherein: the re-categorizing the actions into the updated activity networks is based on the determination that the percentage of the multiple users engaged in the first activity prior to the second activity; and the re-determining the subset of the multiple users is based on a determination that the user engaged in the second activity prior to the first activity.

\* \* \* \* \*